United States Patent [19]
Kim

[11] Patent Number: 5,361,023
[45] Date of Patent: Nov. 1, 1994

[54] MOVABLE ROBOT

[75] Inventor: Sang-Gwon Kim, Suwon, Rep. of Korea

[73] Assignee: Samsung Electronics Co., Ltd., Kyungki-do, Rep. of Korea

[21] Appl. No.: 140,419

[22] Filed: Oct. 25, 1993

[30] Foreign Application Priority Data

Oct. 26, 1992 [KR] Rep. of Korea ............... 92-19767

[51] Int. Cl.$^5$ ............................................. H02J 7/00
[52] U.S. Cl. ......................... 318/568.16; 318/568.18; 901/1
[58] Field of Search ................................ 318/560–646; 395/80–99; 901/1, 3, 5, 7, 9, 12–15; 414/730–732; 364/424.1–424.16, 426; 180/166–169

[56] References Cited

U.S. PATENT DOCUMENTS

| | | | |
|---|---|---|---|
| 4,710,020 | 12/1987 | Maddox et al. | 901/1 |
| 4,736,116 | 4/1988 | Pavlak et al. | 307/41 |
| 4,751,658 | 6/1988 | Kadonoff et al. | 901/1 |
| 4,772,875 | 9/1988 | Maddox et al. | 180/167 X |
| 4,777,416 | 10/1988 | George et al. | 318/568 |
| 4,829,442 | 5/1989 | Kadonoff et al. | 364/424.02 |
| 4,834,531 | 5/1989 | Ward | 356/5 |

Primary Examiner—Paul Ip
Attorney, Agent, or Firm—Sughrue, Mion, Zinn, Macpeak & Seas

[57] ABSTRACT

A movable robot comprising an oscillating circuit for oscillating to output an oscillating frequency signal, a microcomputer for controlling the overall functioning of the movable robot, an ultrasoniciwave sensor for sensing obstacles in response to a first operating signal from the microcomputer, infrared-ray transmitters for emitting infrared-rays in response to second and third operating signals from the microcomputer and the oscillating frequency signal from the oscillating circuit, infrared-ray receivers for receiving the infrared-rays reflected off the obstacles and for outputting resultant infrared-ray receive signals, an illumination sensing circuit for sensing illumination in the vicinity of the movable robot, sensitivity control circuits for controlling sensitivities of the infrared-ray receivers in response to an illumination sense signal from the illumination sensing circuit, an infrared-ray receive signal transfer circuit for transferring the infrared-ray receive signals from the infrared-ray receivers to the microcomputer, and a wheel driving circuit for driving wheels of the movable robot in response to a drive control signal from the microcomputer that varies with the transferred infrared-ray receive signals.

8 Claims, 6 Drawing Sheets

MOVABLE ROBOT

BACKGROUND OF THE INVENTION

1. Field of the Invention

The present invention relates in general to movable robots, and more particularly to a movable robot in which sensitivities of infrared-ray receivers for sensing obstacles can be controlled.

2. Description of the Prior Art

Generally, movable robots are disposed in homes and other places requiring the premises to be guarded. Such a movable robot moves in a predetermined zone under a command of tile user to keep watch for intruders. Upon appearance of an intruder during movement, the movable robot senses a thermal infrared-ray of a natural frequency reflected off the intruder and gives an alarm.

In addition to a thermal infrared-ray sensor for sensing the reflected thermal infrared-ray from the intruder, the movable robot comprises a plurality of ultrasonic wave sensors for sensing obstacles on a path along which the movable robot moves, thereby allowing the movable robot to avoid the obstacles during movement.

However, the above-mentioned conventional movable robot has a disadvantage in that it frequently collides with the obstacles in its path, such as fixtures, installations, etc. while moving in its predetermined zone to keep watch for intruders, since it fails to accurately sense the obstacles in the path of movement. Namely, the ultrasonic wave sensors in the conventional movable robot cannot accurately sense the obstacles on the moving path because they have large reflection errors. For this reason, for example, a flower vase may be broken in a collision with the movable robot. Also, when the movable robot collides with an object requiring attention, a safety accident may occur. This results in increased economic loss and added danger in work operations.

SUMMARY OF THE INVENTION

Therefore, the present invention has been made in view of the above problem, and it is an object of the present invention to provide a movable robot for accurately sensing obstacles on a path of movement so that damage and economic losses can be reduced and a safety in work operations can be increased.

In accordance with tile present invention, the above and other objects can be accomplished by a provision of a movable robot comprising oscillating means for receiving a DC voltage from power supply means and oscillating to output an oscillating frequency signal; system control means for receiving the DC voltage from said power supply means and controlling the whole function of the movable robot; ultrasonic wave sensing means for sensing obstacles, said ultrasonic wave sensing means being responsive to a first operating signal from said system control means to emit an ultrasonic wave to the obstacles and receive the ultrasonic wave reflected on the obstacles; infrared-ray transmission means for emitting infrared-rays to the obstacles in response to second and third operating signals from said system control means and the oscillating frequency signal from said oscillating means; infrared-ray reception means for receiving the infrared-rays which are transmitted from said infrared-ray transmission means and then reflected on the obstacles and outputting the resultant infrared-ray receive signal; illumination sensing means for sensing an illumination around the movable robot and outputting the resultant illumination sense signal; sensitivity control means for outputting a sensitivity control signal in response to the illumination sense signal from said illumination sensing means to control a sensitivity of said infrared-ray reception means; infrared-ray receive signal transfer means for transferring the infrared-ray receive signal from said infrared-ray reception means to said system control means; and wheel driving means for driving wheels of the movable robot in response to a drive control signal from said system control means to allow the movable robot to move avoiding the obstacles.

BRIEF DESCRIPTION OF THE DRAWINGS

Other objects and aspects of the invention will become apparent from the following description of embodiments with reference to the accompanying drawings, in which:

FIG. 3 is a view illustrating positions in which an ultrasonic wave sensor, first and second infrared-ray transmitters and first and second infrared-ray receivers can be disposed in the movable robot in accordance with the embodiment of the present invention, wherein:

DETAILED DESCRIPTION OF THE PREFERRED EMBODIMENT

Figure 1:
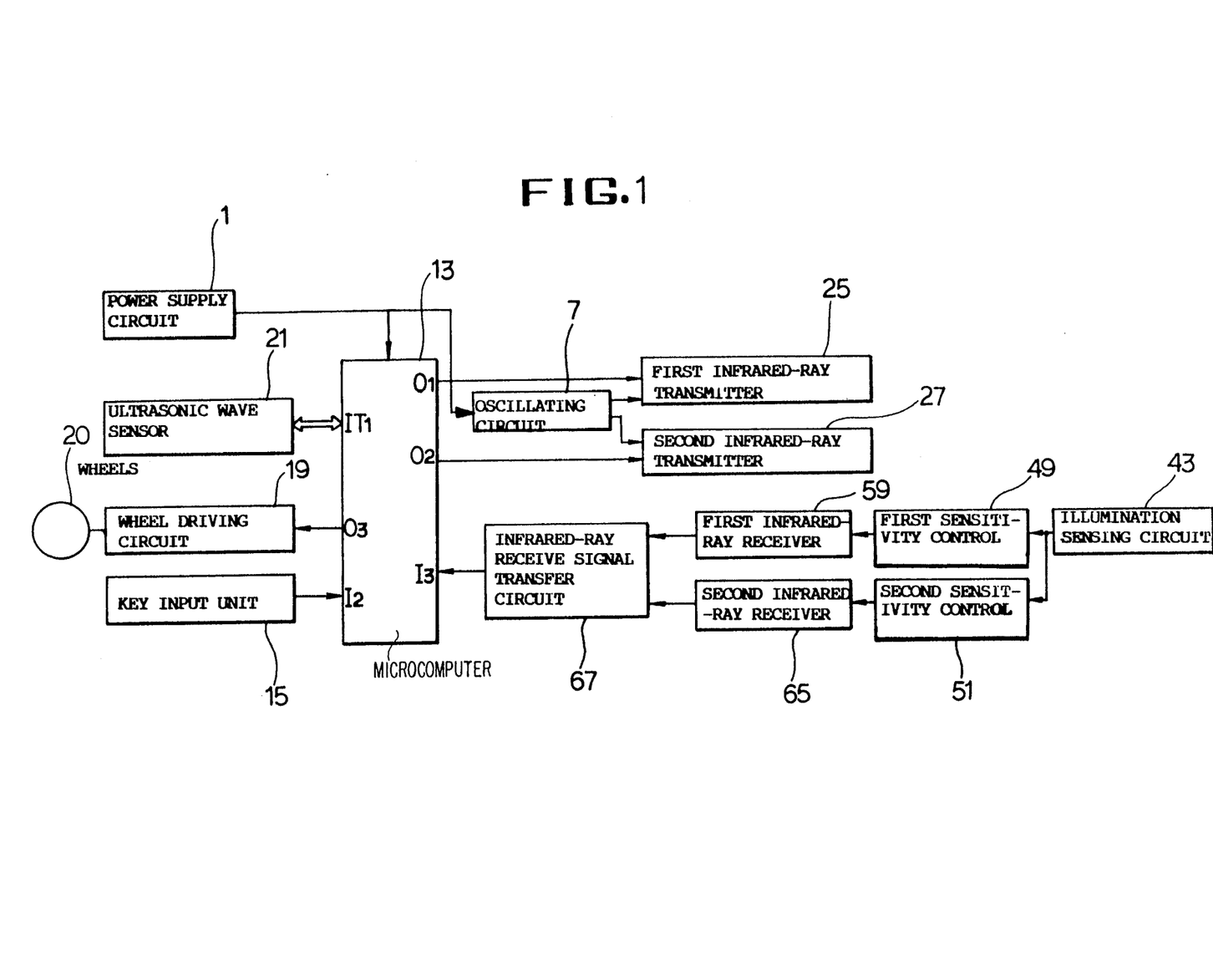
FIG. 1 is a block diagram of a movable robot in accordance with an embodiment of the present invention.
Figure 2:
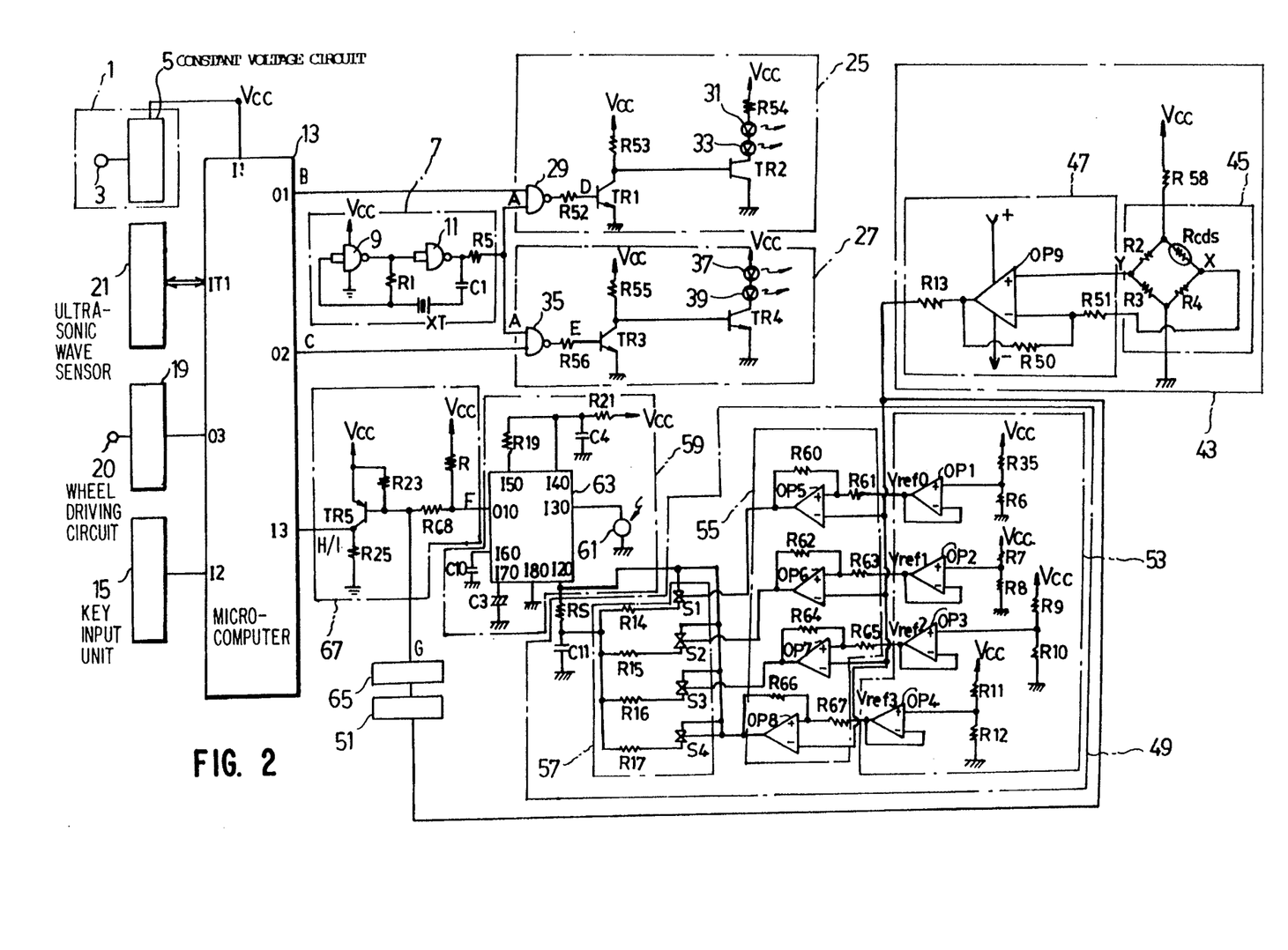
FIG. 2 is a detailed circuit diagram of the movable robot shown in FIG. 1.

FIG. 1 is a block diagram of a movable robot in accordance with an embodiment of the present invention and FIG. 2 is a detailed circuit diagram of the movable robot illustrated in FIG. 1. As shown in these drawings, the movable robot of the present invention comprises a power supply circuit; 1 for supplying a desired DC voltage. The power supply circuit 1 is provided with a battery 3 and a constant voltage circuit which is connected to the battery 3 to output the desired DC voltage.

An oscillating circuit 7 is provided in the movable robot to receive the DC voltage from the power supply circuit 1 and oscillate to output an oscillating frequency signal. The oscillating circuit 7 is provided with two NAND gates 9 and 11, two resistors R1 and RS, a capacitor C1 and a crystal oscillator XT.

A microcomputer 13 is connected to the power supply circuit 1 to receive the DC voltage from the power supply circuit 1 and control the overall functioning of the movable robot.

A key input unit 15 is connected to the microcomputer 13 to input operating command signals from the user and output corresponding signals to the microcomputer 13.

An ultrasonic wave sensor 21 is connected to an interface terminal IT1 of the microcomputer 13 to sense obstacles. The ultrasonic wave sensor 21 is responsive to a first operating signal from the microcomputer 13 to emit an ultrasonic wave to the obstacles and receive the return ultrasonic wave reflected off the obstacles.

First and second infrared-ray transmitters 25 and 27 are connected commonly to an output terminal of the oscillating circuit 7 and respectively to output terminals O1 and O2 of the microcomputer 13 to emit infrared-rays in upward and forward directions from the movable robot in response to second and third operating signals from the microcomputer 13 and the oscillating frequency signal from the oscillating circuit 7.

First and second infrared-ray receivers 59 and 65 are also provided in the movable robot to receive the return infrared-rays which, after being transmitted from the first and second infrared-ray transmitters 25 and 27, are then reflected by the obstacles. The receivers 59 and 65 output the resultant first and second infrared-ray receive signals, respectively.

An illumination sensing circuit 43 is also provided in the movable robot to sense illuminations around the movable robot and to output the resultant illumination sense signal.

First and second sensitivity control circuits 49 and 51 are connected respectively between the first and second infrared-ray receivers 59 and 65 and the illumination sensing circuit 43 to output first and second sensitivity control signals in response to the illumination sense signal from the illumination sensing circuit 43 to control sensitivities of the first and second infrared-ray receivers 59 and 65, respectively.

An infrared-ray receive signal transfer circuit 67 is connected between the microcomputer 13 and the first and second infrared-ray receivers 59 and 65 to transfer the infrared-ray receive signals from the first and second infrared-ray receivers 59 and 65 to the microcomputer 13.

A wheel driving circuit 19 is connected to an output terminal O3 of the microcomputer 13 to drive wheels 20 of the movable robot in response to a drive control signal from the microcomputer 13 to allow the movable robot to move such that it avoids the obstacles.

The first infrared-ray transmitter 25 includes a NAND gate 29 for inputting the second operating signal from the microcomputer 13 and the oscillating frequency signal from the oscillating circuit 7, a transistor TR1 having a base connected to an output terminal of the NAND gate 29, a transistor TR2 having a base connected to a collector of the transistor TR1, and a pair of infrared-ray emitting diodes 31 and 33 connected in series to a collector of the transistor TR2.

The second infrared-ray transmitter 27 includes a NAND gate 35 for inputting the third operating signal from the microcomputer 13 and the oscillating frequency signal from the oscillating circuit 7, a transistor TR3 having a base connected to an output terminal of the NAND gate 35, a transistor TR4 having a base connected to a collector of the transistor TR3, and a pair of infrared-ray emitting diodes 37 and 39 connected in series to a collector of the transistor TR4.

The first infrared-ray receiver 59 includes an infrared-ray receiving diode 61 fop receiving the infrared-rays which are transmitted from the first. infrared-ray transmitter 25 and then reflected by the obstacles, a pre-amplifier 63 for amplifying an output signal from the infrared-ray receiving diode 61 by an amplification degree which is determined according to the first sensitivity control signal from the first sensitivity control circuit 49 and outputting the resultant first infrared-ray receive signal to the infrared-ray receive signal transfer circuit 67, capacitors C10 and C3 for cooperating to stabilize an operation of the pre-amplifier 63, a resistor R19 and a capacitor C4 for cooperating to determine a receivable center frequency of the pre-amplifier 63, and a resistor R21 connected commonly to the resistor R19 and the capacitor C4. The resistor R21 acts to transfer the DC voltage from the power supply circuit 1 to the pre-amplifier 63.

The second infrared-ray receiver 65 has the same construction as that of the first infrared-ray receiver 59 to receive the infrared-rays which are transmitted from the second infrared-ray transmitter 27 and then reflected by the obstacles, and output the resultant second infrared-ray receive signal to the infrared-ray receive signal transfer circuit 67, in the same manner as that in the first infrared-ray receiver 59.

The illumination sensing circuit 43 includes a bridge circuit 45 with resistors R2-R4 and a cadmium sensor resistor Reds, and an inversion amplifying circuit 47 connected to the bridge circuit 45. The inversion amplifying circuit 47 acts to output the illumination sense signal to the first and second sensitivity control circuits 49 and 51. The illumination sense signal has a high level when the illumination around the movable robot is low, i.e., dark, and has a low level when the illumination around the movable robot is high, i.e., bright.

The first sensitivity control circuit 49 includes a reference voltage output circuit; 53 for outputting a plurality of different reference voltages Vref0-Vref3, a comparison circuit 55 for comparing the illumination sense signal from the illumination sensing circuit 43 with the reference voltages Vref0-Vref3 from the reference voltage output circuit 53, respectively, and outputting the resultant comparison signals, and a sensitivity control signal output circuit 57 for outputting the first sensitivity control signal to the first infrared-ray receiver 59 in response to the comparison signals from the comparison circuit 55.

The reference voltage output circuit 53 is provided with a pair of resistors R35 and R6 for dividing the DC voltage from the power supply circuit 1, a pair of resistors R7 and R8 for dividing the DC voltage from the power supply circuit 1, a pair of resistors R9 and R10 for dividing the DC voltage from the power supply circuit 1, a pair of resistors R11 and R12 for dividing the DC voltage from the power supply circuit 1, and a plurality of operational amplifiers OP1-OP4 for inputting the voltages divided by the resistors R35 and R6, R7 and R8, R9 and R10 and R11 and R12 at their non-inverting input terminals and outputting the different reference voltages Vref0-Vref3 to the comparison circuit 55 at their output terminals, respectively.

The comparison circuit 55 is provided with a plurality of comparators OP5-OP8, each of which has a non-inverting input terminal connected to a corresponding one of the output terminals of the operational amplifiers OP1-OP4 in the reference voltage output circuit 53 for inputting a corresponding one of the comparison signals from the operational amplifiers OP1-OP4, an inverting input terminal connected to a resistor R13 in the inversion amplifying circuit 47 of the illumination sensing circuit 43 for inputting the illumination sense signal from the inversion amplifying circuit 47 and an output terminal for outputting a corresponding one of the comparison signals to the sensitivity control signal output circuit 57.

The sensitivity control signal output circuit 57 is provided with a reference resistor RS having a reference resistance, a plurality of analog switches S1–S4, each of which is connected to a corresponding one of output terminals of the comparators OP5–OP8 in the comparison circuit 55 to be turned on/off in response to a corresponding one of the comparison signals from the comparators OP5–OP8, and a plurality of resistors R14–R17, each of which is connected in series to a corresponding one of the analog switches S1–S4. Each of the resistors R14–R17 is connected in parallel to the reference resistor RS when the corresponding one of the analog switches S1–S4 is turned on. Also, the reference resistor RS is connected to an input terminal I20 of the pre-amplifier 63 in the first infrared-ray receiver 59.

The second sensitivity control circuit 51 has the same construction as that of the first sensitivity control circuit 49 to output the second sensitivity control signal to the second infrared-ray receiver 65 in response to the illumination sense signal from the illumination sensing circuit 43 in the same manner as that in the first sensitivity control circuit 49.

The infrared-ray receive signal transfer circuit 67 includes a transistor TR5 that is turned on/off in response to the first and second infrared-ray receive signals from the first and second infrared-ray receivers 59 and 65 for transferring inverted ones of the first and second infrared-ray receive signals to the microcomputer 13, and a pair of resistors R23 and R25 for assisting the transistor TR5.

Figure 3A:
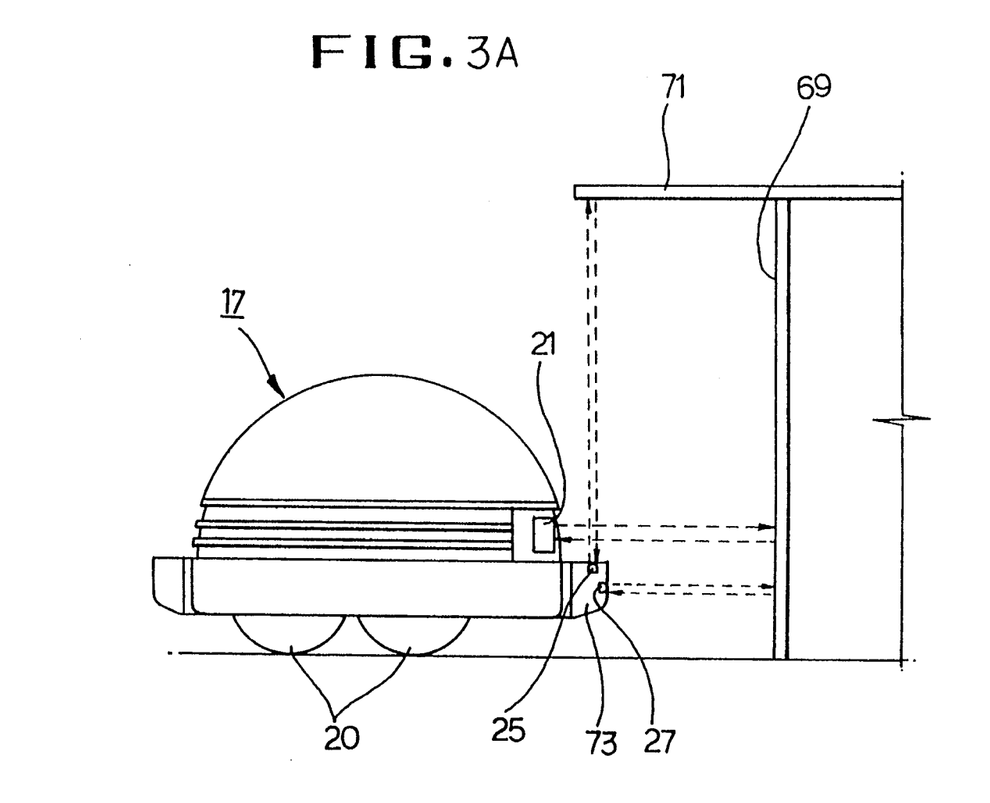
FIG. 3A is a side view of the movable robot in partial section.
Figure 3B:
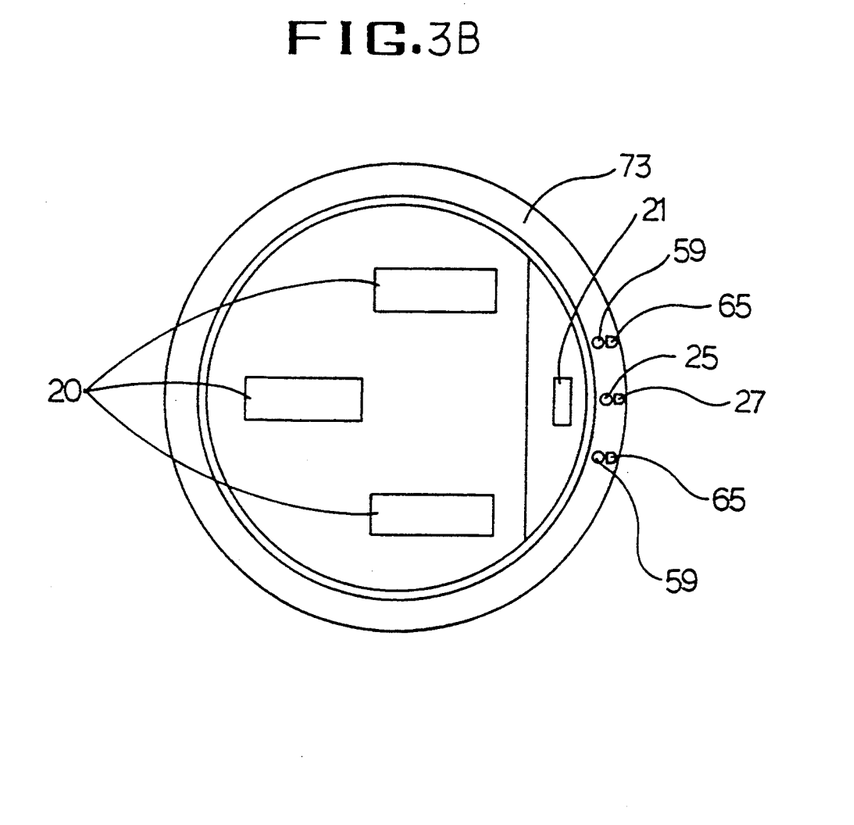
FIG. 3B is a bottom view of the movable robot.
Figure 3C:
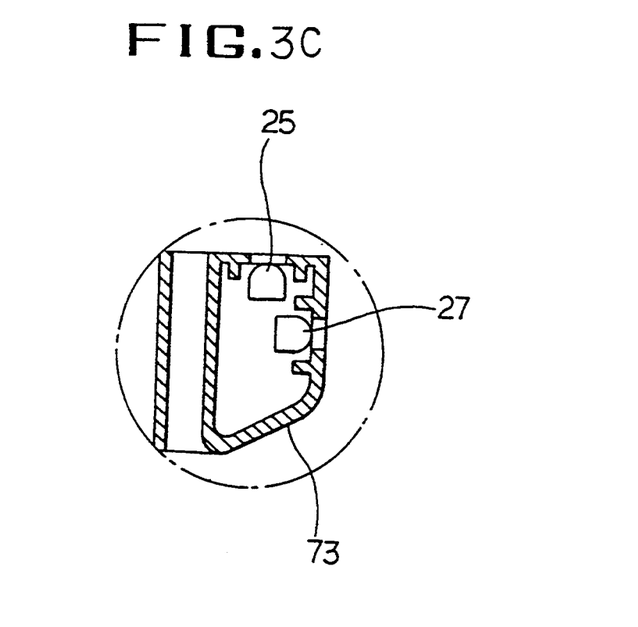
FIG. 3C is an enlarged view of part of FIG. 3A.

FIG. 3 is a view illustrating positions in which the ultrasonic wave sensor 21, the first and second infrared-ray transmitters 25 and 27 and the first and second infrared-ray receivers 59 and 65 in FIG. 2 can be disposed in the movable robot (here designated by the reference numeral 17 in partial section), wherein FIG. 3A is a side view of the movable robot 17, FIG. 3B is a bottom view of the movable robot 17 and FIG. 3C is an enlarged view of a portion of FIG. 3A. As shown in these drawings, the ultrasonic wave sensor 21 is disposed over a bumper 73 of the movable robot 17 to sense any obstacles (here designated by the reference numeral 69) in the front direction of the movable robot 17. The second infrared-ray transmitter 27 and receiver 65 are disposed in the bumper 73 of the movable robot 17 to sense the obstacles 69 in the front direction of the movable robot 17. The first infrared-ray transmitter 25 and receiver 59 are disposed in the bumper 73 of the movable robot 17 to sense the obstacles (here designated by the reference numeral 71) in the upward direction of the movable robot 17. As seen, the first and second infrared-ray receivers 59 and 65 may be numerous.

The operation of the movable robot with the above-mentioned construction in accordance with the embodiment of the present invention will hereinafter be described in detail with reference to FIGS. 4A to 4I and FIG. 5.

First, assume that the illumination around the movable robot is low or dark in an initial condition. When a power switch (not shown) is turned on under the initial condition, a DC power from the battery 3 is supplied to the constant voltage circuit 5. Upon receiving the DC power from the battery 3, the constant voltage circuit 5 supplies the constant DC voltage of 5 V to an input terminal I1 of the microcomputer 13 and power terminals of the oscillating circuit 7 and the illumination sensing circuit 43.

Then, in the illumination sensing circuit 43, voltages at X and Y points of the bridge circuit 45 have the same level because the illumination around the movable robot is low or dark. As a result, an illumination sense signal corresponding to the voltage at the X or Y point of the bridge circuit 45 is outputted from an output terminal of an operational amplifier OP9 in the inversion amplifying circuit 47 to the first and second sensitivity control circuits 49 and 51.

In the first sensitivity control circuit 49, the comparison signals for low levels are outputted from the comparison circuit 55 since the illumination sense signal corresponding to the voltage at the X point of the bridge circuit 45 is higher in level than all the reference voltages Vref0–Vref3 (here, Vref0>Vref1>Vref2>Vref3) from the reference voltage output circuit 53. In response to the low comparison signals from the comparison circuit 55, the analog switches S1–S4 in the sensitivity control signal output circuit 57 are all turned off, thereby causing the first sensitivity control signal corresponding to the resistance of the reference resistor RS to be applied to the input terminal I20 of the pre-amplifier 63 in the first infrared-ray receiver 59.

Similarly, in the second sensitivity control circuit 51, the comparison signals of low levels are outputted from the comparison circuit 55 since the illumination sense signal corresponding to the voltage at the X point of the bridge circuit 45 is higher in level than all the reference voltages Vref0–Vref3 from the reference voltage output circuit 53. The analog switches S1–S4 in the sensitivity control signal output circuit 57 are all turned off in response to the low comparison signals from the comparison circuit 55. As a result, the second sensitivity control signal corresponding to the resistance of the reference resistor RS is applied to the input terminal I20 of the pro-amplifier 63 in the second infrared-ray receiver 65.

Figure 4A:
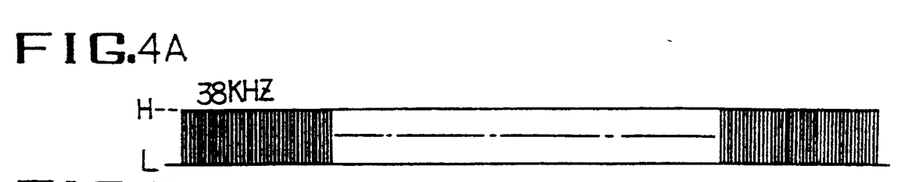
FIGS. 4A to 4I are waveform diagrams of signals from respective components in the movable robot of FIG. 2.

Upon supply of the DC voltage from the power supply circuit 1 to the oscillating circuit 7, the supplied DC voltage is applied to the NAND gate 9 and then applied to the crystal oscillator XT. As a result, an oscillating frequency signal of 38 KHZ as shown in FIG. 4A appears at an output terminal of the NAND gate 11.

Also, upon supply of the DC voltage from the power supply circuit 1 to the input terminal I1 of the microcomputer 13, the microcomputer 13 becomes operable. Under this condition, the key input unit 15 receives operating command signals from the user and outputs corresponding operating command signals to an input terminal I2 of the microcomputer 13.

Upon receiving an operating command signal from the key input unit 15, the microcomputer 13 outputs the drive control signal of a high level to the wheel driving circuit 19 at its output terminal O3 and the first operating signal of a high level to the ultrasonic wave sensor 21 at its interface terminal IT1. Also, the microcomputer 13 outputs alternately the second and third operating signals to the first and second infrared-ray transmitters 25 and 27 at its output terminals O1 and O2.

In response to the high drive control signal from the microcomputer 13, the wheel driving circuit 19 rotates the wheels 20 of the movable robot 17, thereby allowing the movable robot 17 to move. Then, the movable robot 17 enters a predetermined work operation such as, for example, keeping watch intruders. The movable robot 17 performs this operation by sensing a thermal infrared-ray of a natural frequency reflected on the intruder using a thermal infrared-ray sensor (not shown).

The ultrasonic wave sensor 21 emits the ultrasonic wave in the forward direction of the movable robot 17 in response to the high first operating signal from the interface terminal IT1 of the microcomputer 13. In the presence of an obstacle 69 in the front direction of the movable robot 17, the ultrasonic wave sensor 212 receives the ultrasonic wave reflected on the obstacles 69 and outputs the resultant obstacle sense signal to the interface terminal IT1 of the microcomputer 13. At that time when the microcomputer 13 receives the obstacle sense signal from the ultrasonic wave sensor 21, it outputs the drive control signal to the wheel driving circuit 19 at its output terminal O3 to change a moving direction of the movable robot 17, so as not to collide with the obstacle 69.

Figure 4B:
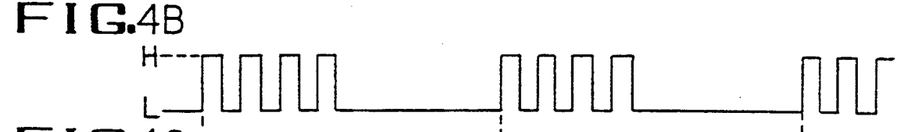
Figures 4C, 4D:
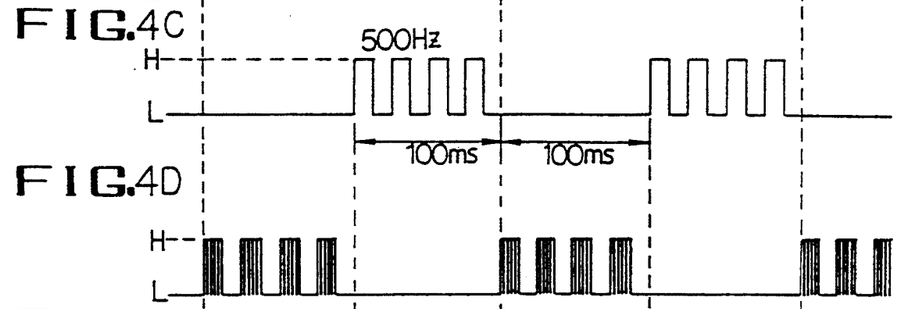

Second and third operating signals of 500 HZ as shown in FIGS. 4B and 4C are alternately output from the output terminals O1 and O2 of the microcomputer 13. A switching period of the alternating second and third operating signals is 100 ms. The second and third operating signals of 500 HZ as shown in FIGS. 4B and 4C are applied to the NAND gates 29 and 35 in the first and second infrared-ray transmitters 25 and 27, respectively.

Figure 4E:
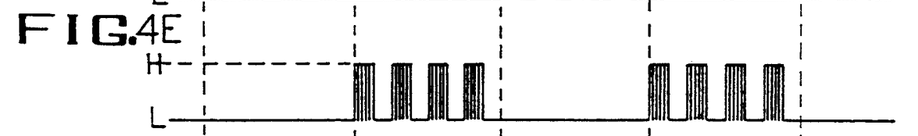
Figure 4F:
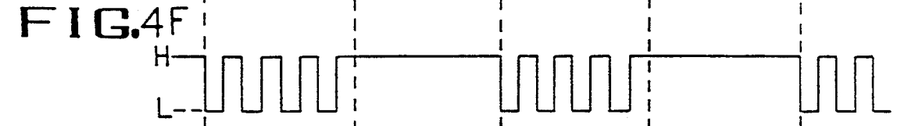
Figure 4G:
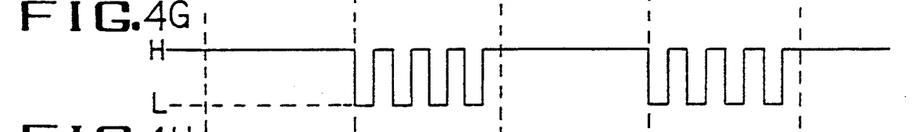
Figures 4H, 4I:
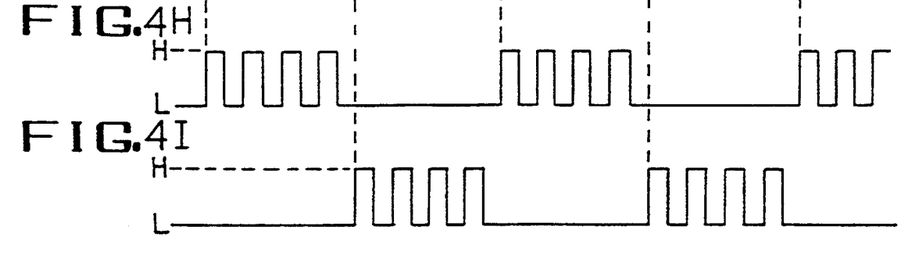

FIGS. 4A to 4I are waveform diagrams of the signals from the respective components in the movable robot in FIG. 2. Namely, FIG. 4A is a waveform diagram of the oscillating frequency signal from the NAND gate 11 in the oscillating circuit 7, FIG. 4B is a waveform diagram of the second operating signal from the output terminal O1 of the microcomputer 13, FIG. 4C is a waveform diagram of the third operating signal from the output terminal O2 of the microcomputer 13, FIG. 4D is a waveform diagram of an output signal from the NAND gate 29 in the first infrared-ray transmitter 25, FIG. 4E is a waveform diagram of an output signal from the NAND gate 35 in the second infrared-ray transmitter 27, FIG. 4F is a waveform diagram of the infrared-ray receive signal from an output terminal O10 of the pre-amplifier 63 in the first infrared-ray receiver 59, FIG. 4G is a waveform diagram of the infrared-ray receive signal from the output terminal O10 of the pre-amplifier 63 in the second infrared-ray receiver 65, FIG. 4H is a waveform diagram of the signal which the infrared-ray receive signal transfer circuit 67 applies to an input terminal I3 of the microcomputer 13 upon receiving the infrared-ray receive signal from the first infrared-ray receiver 59 as shown in FIG. 4F, and FIG. 4I is a waveform diagram of the signal which the infrared-ray receive signal transfer circuit 67 applies to the input terminal I3 of the microcomputer 13 upon receiving the infrared-ray receive signal from the second infrared-ray receiver 65 as shown in FIG. 4G.

As mentioned above, in the first infrared-ray transmitter 25, the second operating signal from the microcomputer 13 as shown in FIG. 4B is applied to the NAND gate 29, which also receives the oscillating frequency signal from the oscillating circuit 7 as shown in FIG. 4A. As a result, a signal modulated at 38 KHZ as shown in FIG. 4D appears at the output terminal of the NAND gate 29.

The transistors TR1 and TR2 are turned on/off at the frequency of the output signal from the NAND gate 29 as shown in FIG. 4D, thereby causing the infrared-ray emitting diodes 31 and 33 to emit the infrared-rays at the frequency of the output signal from the NAND gate 29 as shown in FIG. 4D in the upward direction of the movable robot 17.

Similarly, in the second infrared-ray transmitter 27, the third operating signal from the microcomputer 13 as shown in FIG. 4C is applied to the NAND gate 35, which also receives the oscillating frequency signal from the oscillating circuit 7 as shown in FIG. 4A. In the same manner as that in the first infrared-ray transmitter 25, the infrared-ray emitting diodes 37 and 39 emit the infrared-rays at the frequency of the output signal from the NAND gate 35 as shown in FIG. 4E in the front direction of the movable robot 17.

While the movable robot 17 moves, it emits the infrared-rays as mentioned above. Upon appearance of the obstacle 71 in a position in the path of the movable robot 17 such as, for example, in the upward direction of the movable robot 17, the infrared-ray receiving diode 61 in the first infrared-ray receiver 59 receives the infrared-rays reflected off the obstacle 71. In such a case, the infrared-ray receive signal from the infrared-ray receiving diode 61 has the same waveform as that of the output signal from the NAND gate 29 as shown in FIG. 4D.

In the first infrared-ray receiver 59, the infrared-ray receive signal from the infrared-ray receiving diode 61 is applied to an input terminal I30 of the pre-amplifier 63. The pre-amplifier 63 also receives the first sensitivity control signal from the first sensitivity control circuit 49 at its other input terminal I20. The pre-amplifier 63 amplifies the infrared-ray receive signal from the infrared-ray receiving diode 61 by the amplification degree which is determined according to the first sensitivity control signal from the first sensitivity control circuit 49 and outputs the resultant first infrared-ray receive signal as shown in FIG. 4F at its output terminal O10.

The first infrared-ray receive signal from the pre-amplifier 63 as shown in FIG. 4F is applied through the transistor TR5 in the infrared-ray receive signal transfer circuit 67 as a pulse signal as shown in FIG. 4H to the input terminal I3 of the microcomputer 13.

Upon receiving the pulse signal as shown in FIG. 4H, the microcomputer 13 recognizes the presence of the obstacle 71 in the upward direction of the movable robot 17 and then applies the drive control signal to the wheel driving circuit 19 at its output terminal O3 to change the moving direction of the movable robot 17.

Similarly, an obstacle 69, not in the upward direction of the mob, able robot 17 but in front of it, the may appear. In such a case, infrared-ray receiving diode 61 in the second infrared-ray receiver 65 receives the infrared-rays reflected off the obstacle 69. The infrared-ray receive signal from the infrared-ray receiving diode 61 has the same waveform as that of the output signal from the NAND gate 35 as shown in FIG. 4E.

In the second infrared-ray receiver 65, the infrared-ray receive signal from the infrared-ray receiving diode 61 is applied to the input terminal I30 of the pre-amplifier which also receives the second sensitivity control signal from the second sensitivity control circuit 51 at its other input terminal I20. The pre-amplifier 63 amplifies the infrared-ray receive signal from the infrared-ray receiving diode 61 by the amplification degree which is determined according to the second sensitivity control signal from the second sensitivity control circuit 51 and outputs the resultant second infrared-ray receive signal as shown in FIG. 4G at its output terminal O10.

The second infrared-ray receive signal from the pre-amplifier 63 as shown in FIG. 4G is applied through the transistor TR5 in the infrared-ray receive signal transfer circuit 67 as a pulse signal as shown in FIG. 4I to the input terminal I3 of the microcomputer 13.

Upon receiving the pulse signal as shown in FIG. 4I, the microcomputer 13 recognizes the presence of the obstacles 69 in the front direction of the movable robot 17 and then applies the drive control signal to the wheel driving circuit 19 at its output terminal O3 to change the moving direction of the movable robot 17.

When the illumination near the movable robot 17 becomes high or bright while the movable robot 17 moves to avoid the obstacles 69 and 71 after being under condition of low illumination, this results in the sensitivities of the first and second infrared-ray receivers 59 and 65 being lowered. In this case, to compensate, each of the sensitivities of the first and second infrared-ray receivers 59 and 65 is increased by reducing the resistance of the resistors connected to the input terminal I20 of the pre-amplifier 63.

In other words, in the illumination sensing circuit 43, the voltage at the X point of the bridge circuit 45 becomes higher in level than that at the Y point thereof since a resistance of the cadmium sensor resistor Rcds thereof becomes small as the illumination around the movable robot 17 becomes high or bright. As a result, the illumination sense signal from the output terminal of the operational amplifier OP9 in the inversion amplifying circuit 47 is lower in level than the voltage at the Y point by a value which can be expressed by the following equation:

$$(\text{the X point voltage} - \text{the Y point voltage}) \times (R50/R51)$$

The resultant illumination sense signal from the inversion amplifying circuit 47 corresponding to the high illumination is applied to the first and second sensitivity control circuits 49 and 51.

In the first sensitivity control circuit 49, for example, provided that the illumination sense signal from the inversion amplifying circuit 47 is higher in level than the reference voltage Vref3 from the operational amplifier OP4 in the reference voltage output circuit 53 and lower in level than the reference voltages Vref0–vref2 from the operational amplifiers OP1–OP3 therein, comparison signals having high levels are from the operational amplifiers OP5–OP7 in the comparison circuit 55, while a comparison signal having a low level is outputted from the operational amplifier OP8 therein. Subsequently, the analog switches S1–S3 in the sensitivity control signal output circuit 57 are turned on in response to the high comparison signals from the operational amplifiers OP5–OP7 in the comparison circuit 55, whereas the analog switch S4 therein is turned off in response to the low comparison signal from the operational amplifier OP8 in the comparison circuit 55. In such a case, the resistors R14–R16 are connected in parallel to the reference resistor RS which is connected to the input terminal I20 of the pre-amplifier 63 in the first infrared-ray receiver 59. The combined resistance of the resistors RS and R14–R16 connected to the input terminal I20 of the pre-amplifier 63 is smaller than the resistance of the reference resistor RS. As a result, the first sensitivity control signal corresponding to the combined resistance of the resistors RS and R14–R16 is applied to the input terminal I20 of the pre-amplifier 63.

Figure 5:
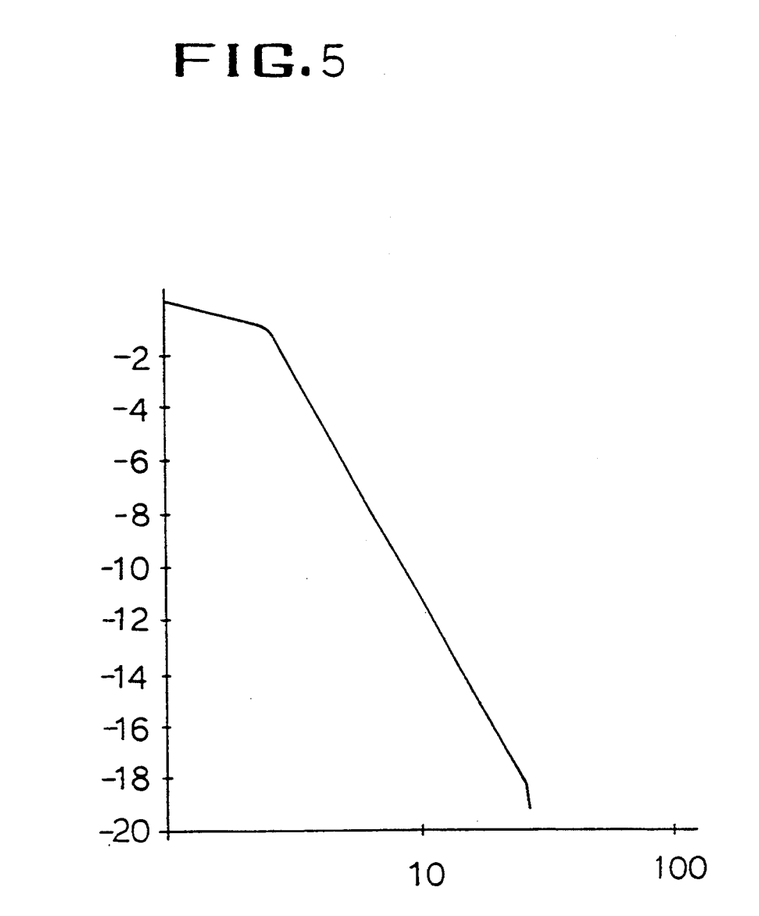
FIG. 5 is a graph illustrating a relationship between a relative voltage gain of a pre-amplifier shown in FIG. 2 and a resistance of resistors connected to an input terminal of the pre-amplifier.

FIG. 5 is a graph illustrating a relationship between a relative voltage gain of the pre-amplifier 63 and the resistance of resistors connected to the input terminal I20 of the pre-amplifier 63. As shown in this drawing, the voltage gain of the pre-amplifier 63 is high in the case where the plurality of resistors RS and R14–R16 are connected thereto, as compared with the connection of the single resistor RS thereto. Therefore, the pro-amplifier 63 amplifies the Infrared-ray receive signals from the infrared-ray receiving diode 61 by a higher amplification degree which is determined according to the first sensitivity control signal from the first sensitivity control circuit 49 and outputs the resultant first infrared-ray receive signal at its output terminal O10.

Namely, the pre-amplifier 63 amplifies the infrared-ray receive signal from the upward infrared-ray receiving diode 61 by such an amplification degree that it compensates for the sensitivity of the infrared-ray receive signal, reduced as the illumination around the movable robot is high or bright. As a result, the sensitivity of the infrared-ray receive signal from the upward infrared-ray receiving diode 61 is adjusted for surrounding conditions.

Similarly, if the illumination sense signal from the inversion amplifying circuit 47 corresponds to high illumination, the second sensitivity control circuit 51 outputs a voltage gain signal i.e., second sensitivity control signal, to the second infrared-ray receiver 65 in response to the received illumination sense signal. In the second infrared-ray receiver 65, the pro-amplifier 63 amplifies the infrared-ray receive signal from the front infrared-ray receiving diode 61 by a higher amplification degree which is determined according to the second sensitivity control signal from the second sensitivity control circuit 51 and outputs the resultant second infrared-ray receive signal at its output terminal O10. As a result, the sensitivity of the infrared-ray receive signal from the front infrared-ray receiving diode 61 is adjusted to the brighter illumination around the movable robot.

Therefore, in response to the first and second infrared-ray receive signals with compensated sensitivities, the microcomputer 13 recognizes the presence of the obstacles 69 and 71 in the front and upward directions of the movable robot 17 with greater certainty. Accordingly, the robot 17 applies the drive control signal to the wheel driving circuit 19 at its output terminal O3 to change the moving direction of the movable robot 17, so as not to collide with the obstacles 69 and 71.

Furthermore, in the movable robot in accordance with this embodiment of the present invention, the first and second infrared-ray receivers 59 and 65 cannot confuse the infrared-rays reflected off the obstacles with remote control signals for a television (TV) or a video tape recorder (VTR) because the second and third operating signals from the microcomputer 13 are drive pulse signals of 500 HZ as shown in FIGS. 4B and 4C. Also, in the first and second infrared-ray transmitters 25 and 27, the drive pulse signals of 500 HZ are modulated into the signals of 38 KHZ as shown in FIG. 4D and 4E, respectively. Therefore, the infrared-rays from the first and second infrared-ray transmitters 25 and 27 can be propagated over long distances.

As apparent from the above description, according to the present invention, the sensitivities of the infrared-ray receivers for sensing the obstacles can be compensated based on the illumination around the movable robot by the sensitivity control circuits. The infrared-ray receivers amplify the infrared-rays reflected by the obstacles according to the sensitivity control signals from the sensitivity control circuits. Therefore, even when the illumination around the movable robot is high, the movable robot can recognize the presence of obstacles with a high degree of certainty and can maneuver accurately to avoid the obstacles. This has the advantageous effects of reducing economic loss resulting from collisions between the robot and obstacles in its vicinity and of rendering work operations more safe. Also, the infrared-ray transmitters and receivers are preferably disposed in the robot's bumper to detect obstacles in the front and upward directions of the movable robot. Therefore, obstacles can readily be detected even though they have sharp angles or low projections.

Although preferred embodiments of the present invention have been disclosed for :illustrative purposes, those skilled in the art will appreciate that various modifications, additions and substitutions are possible, without departing from the scope and spirit of the invention as disclosed in the accompanying claims.

What is claimed is:

1. A movable robot comprising: oscillating means for receiving a DC voltage from power supply means and for oscillating to output an oscillating frequency signal;
    system control means for receiving the DC voltage from said power supply means and for outputting a first, second and third operating signals and a drive control signal;
    ultrasonic wave sensing means for sensing obstacles, said ultrasonic wave sensing means being responsive to the first operating signal from said system control means to emit an ultrasonic wave and receive a return ultrasonic wave reflected by the obstacles;
    infrared-ray transmission means for emitting infrared-rays in response to the second and third operating signals from said system control means and the oscillating frequency signal from said oscillating means;
    infrared-ray reception means for receiving return infrared-rays which, after the infrared-rays are emitted by said infrared-ray transmission means, are reflected by the obstacles, and for outputting a resultant infrared-ray receive signal;
    illumination sensing means for sensing an illumination around the movable robot and for outputting a resultant illumination sense signal;
    sensitivity control means for outputting a sensitivity control signal in response to the illumination sense signal from said illumination sensing means to control a sensitivity of said infrared-ray reception means;
    infrared-ray receive signal transfer means for transferring the infrared-ray receive signal from said infrared-ray reception means to said system control means; and
    wheel driving means for driving wheels of the movable robot in response to the drive control signal from said system control means said system control means regulating the drive control signal in accordance with the transferred infrared-ray receive signal.

2. A movable robot as set forth in claim 1, wherein said infrared-ray transmission means comprises:
    a first infrared-ray transmitter for emitting the infra-red-rays in an upward direction of the movable robot in response to the second operating signal from said system control means and the oscillating frequency signal from said oscillating means; and
    a second infrared-ray transmitter for emitting the infrared-rays in a forward direction of the movable robot in response to the third operating signal from said system control means and the oscillating frequency signal from said oscillating means.

3. A movable robot as set forth in claim 2, wherein each of said first and second infrared-ray transmitters comprises:
    a NAND gate for inputting a corresponding one of the second and third operating signals from said system control means and the oscillating frequency signal from said oscillating means;
    a first transistor having a base connected to an output terminal of said NAND gate;
    a second transistor having a base connected to a collector of said first transistor; and
    a pair of infrared-ray emitting diodes connected in series to a collector of said second transistor.

4. A movable robot as set forth in claim 1, wherein said infrared-ray reception means comprises:
    an infrared-ray receiving diode for receiving the return infrared-rays reflected by the obstacles;
    a pre-amplifier for amplifying an output signal from said infrared-ray receiving diode by an amplification degree which is determined according to the sensitivity control signal from said sensitivity control means for outputting the resultant infrared-ray receive signal to said infrared-ray receive signal transfer means;
    first and second capacitors cooperating to stabilize an operation of said pre-amplifier;
    a first resistor and a third capacitor cooperating to determine a receivable center frequency of said pre-amplifier; and
    a second resistor connected commonly to said first resistor and said third capacitor for transferring the DC voltage from said power supply means to said pre-amplifier.

5. A movable robot as set forth in claim 1, wherein said illumination sensing means comprises:
    a bridge circuit having a cadmium sensor resistor and a plurality of resistors; and
    an inversion amplifying circuit connected to said bridge circuit for outputting the illumination sense signal to said sensitivity control means, the illumination sense signal having a high level when the illumination around the movable robot is low and a low level when the illumination around the movable robot is high.

6. A movable robot as set forth in claim 1, wherein said sensitivity control means comprises:
    a reference voltage output circuit for outputting a plurality of different reference voltages;
    a comparison circuit for comparing the illumination sense signal from said illumination sensing means with the plurality of different reference voltages from said reference voltage output circuit, respectively, and outputting resultant comparison signals; and
    a sensitivity control signal output circuit for outputting the sensitivity control signal to said infrared-ray reception means in response to the comparison signals from said comparison circuit.

7. A movable robot as set forth in claim 1, wherein said infrared-ray receive signal transfer means comprises:
    a transistor and a pair of resistors, said transistor being switchable between on and off settings in response to the infrared-ray receive signal from said infrared-ray reception means, for inverting and transferring one of the infrared-ray receive signals to said system control means.

8. A movable robot provided with a system for avoiding obstacles, said robot comprising:

an oscillating circuit that outputs an oscillating frequency signal;

a system controller that outputs an operating signal and a drive control signal;

an infrared-ray transmitter that emits infrared-rays in response to the operating signal from said system controller and the oscillating frequency signal from said oscillating circuit;

an infrared-ray receiver having a variable sensitivity, said receiver receiving return infrared-rays which, after the infrared-rays are emitted by said infrared-ray transmitter, are reflected by the obstacles, and said receiver outputting a resultant infrared-ray receive signal;

an illumination sensor that registers a level of ambient illumination in the movable robot vicinity and outputs a resultant illumination sense signal;

a sensitivity controller that outputs a sensitivity control signal, which varies in accordance with the illumination sense signal from said illumination sensor, to said infrared-ray receiver, whereby the sensitivity control signal varies the variable sensitivity of said receiver;

an infrared-ray receive signal transfer circuit that receives the infrared-ray receive signal from said infrared-ray receiver and outputs a processed receive signal to said system controller; and a wheel driving actuator that actuates wheels of the movable robot in response to the drive control signal from said system controller, said system controller regulating the drive control signal in accordance with the processed receive signal.

\* \* \* \* \*